United States Patent [19]

Lambden

[11] 4,070,544
[45] Jan. 24, 1978

[54] ELECTROGRAPHIC APPARATUS AND METHOD OF PRODUCING AN ELECTRODE SURFACE THEREFOR

[75] Inventor: Martin Roy Lambden, Stapehill, Wimborne, England

[73] Assignee: Quest Automation Limited, Stapehill, Wimborne, England

[21] Appl. No.: 710,083

[22] Filed: July 30, 1976

[30] Foreign Application Priority Data

Aug. 5, 1975 United Kingdom .............. 32687/75

[51] Int. Cl.$^2$ ........................................... G08C 21/00
[52] U.S. Cl. ..................................................... 178/18
[58] Field of Search ..................... 178/18, 19; 338/121

[56] References Cited

U.S. PATENT DOCUMENTS

| 2,597,674 | 5/1952 | Robbins | 338/121 |
| 3,480,728 | 11/1969 | Chandler | 178/18 |
| 3,885,097 | 5/1975 | Pobgee | 178/18 |
| 3,921,165 | 11/1975 | Dym | 178/18 |

Primary Examiner—Thomas A. Robinson
Attorney, Agent, or Firm—Pollock, Vande Sande and Priddy

[57] ABSTRACT

Electrographic apparatus, that is apparatus for obtaining electrical signals related to the movement of a point, such as a pen or stylus, over a pressure sensitive surface, and a method of producing an electrode surface for such apparatus. The pressure sensitive surface is formed by the upper surface of a taut flexible membrane. Two generally parallel electrode surfaces are formed by electrically conductive coatings on the lower surface of the flexible membrane and on an upper surface of a backing member so that pressure applied to the pressure sensitive surface locally interconnects the electrode surfaces. In use, voltages are applied orthogonally to the respective electrode surfaces so that the potentials developed at points on the surfaces correspond to the X and Y coordinates of those points. The method of forming such an electrode surface comprises the steps of forming the coating so as to have a region of high resistivity traversed by parallel lines of low resistivity, the lines being interconnected by film resistor tracks, and selectively removing portions of the film material of the resistor tracks to provide uniform potential gradients between adjacent pairs of the lines when a voltage is applied to the electrode surface. The membrane is substantially uniformly tensioned by springs, and the upper surface of the backing member is concave so that the force required to be applied to the membrane to cause the membrane to contact the upper surface of the backing member is substantially independent of the location at which the force is applied.

12 Claims, 9 Drawing Figures

ELECTROGRAPHIC APPARATUS AND METHOD OF PRODUCING AN ELECTRODE SURFACE THEREFOR

BACKGROUND OF THE INVENTION

This invention relates to electrographic apparatus, that is apparatus for producing electrical signals representing data as to the position of a point on a surface. In one application, the invention is concerned with obtaining data related to the movement of a point, such as a pen or stylus, over a sheet which data can be coded for computer processing for eventual reproduction or can be used for transmission to a distance for facsimile reproduction. By this means, hand-written documents or drawings can be reproduced by computer processing or by simultaneous reproduction.

DESCRIPTION OF THE PRIOR ART

In known electrographic apparatus, a flexible membrane is mounted parallel to the surface of a fixed backing member, the opposing surfaces of the membrane and backing member being each provided with a conductive coating to form respective electrode surfaces. One such device is described in Pobgee British patent specification No. 1,310,683 (NRDC) corresponding for U.S. Pat. No. 3,885,097.

Two parallel edges of the fixed coating each have connection strips and two parallel edges of the coating on the flexible membrane also have connection strips at right angles to the strips on the fixed coating.

In use, a document to be recorded is placed on the flexible surface and a stylus, typically a ball-point pen, is used to write on the document. This causes the flexible membrane to be depressed locally under the stylus so that contact is made between the electrode surfaces. By electrically energizing the two surfaces in a suitable manner, it is possible to obtain two analogue electrical voltages representing the coordinates of the position of the stylus.

A difficulty with the known devices is that, in use, the hand tends normally to rest on the part of a document being written, producing unwanted contact over a wide area in addition to the desired local contact under the stylus.

The accuracy with which the electrical output signals represent the coordnates of the location at which the stylus is applied is limited by the uniformity of the surface resistivity of the electrode surfaces, and a high degree of uniformity becomes progressively more difficult to achieve with increasing surface area. These factors impose limitations on the size and usefulness of the device.

SUMMARY OF THE INVENTION

It is an object of the present invention to provide electrographic apparatus in which the above-described disadvantages of known devices are eliminated or substantially reduced.

From one aspect the invention provides a method of producing an electrode surface for electrographic apparatus, the method comprising the steps of forming on an insulating surface an electrically conducting coating comprising a series of separate strips of low surface resistivity interconnected by areas of high surface resistivity, providing connection means electrically connected with said coating so that the potential gradient developed in said coating in response to voltage supplied to said connection means is substantially orthogonal to said strips, and adjusting the total resistances between respective adjacent pairs of said strips so as to substantially equalize the mean potential gradients which are developed across respective ones of said areas in response to such voltage supplied to said connection means.

From another aspect of the invention provides electrographic apparatus comprising:
a. a pressure sensitive surface which, in use of the apparatus, responds to pressure applied by a writing instrument to provide electrical output signals related to the location of the instrument;
b. a hand-supporting member upon which the hand may conveniently be rested during writing on said pressure sensitive surface, and
c. means supporting said pressure sensitive surface and said hand-supporting member and arranged to permit relative movement between the said surface and member during writing on said surface whereby, in use, the writing instrument can be moved conveniently to any required position on said surface.

DESCRIPTION OF THE ILLUSTRATED EMBODIMENTS

In order that the invention may be clearly understood and readily carried into effect, electrographic apparatus embodying the invention will now be described, by way of example, with reference to the accompanying drawings, in which.

Figure 1:
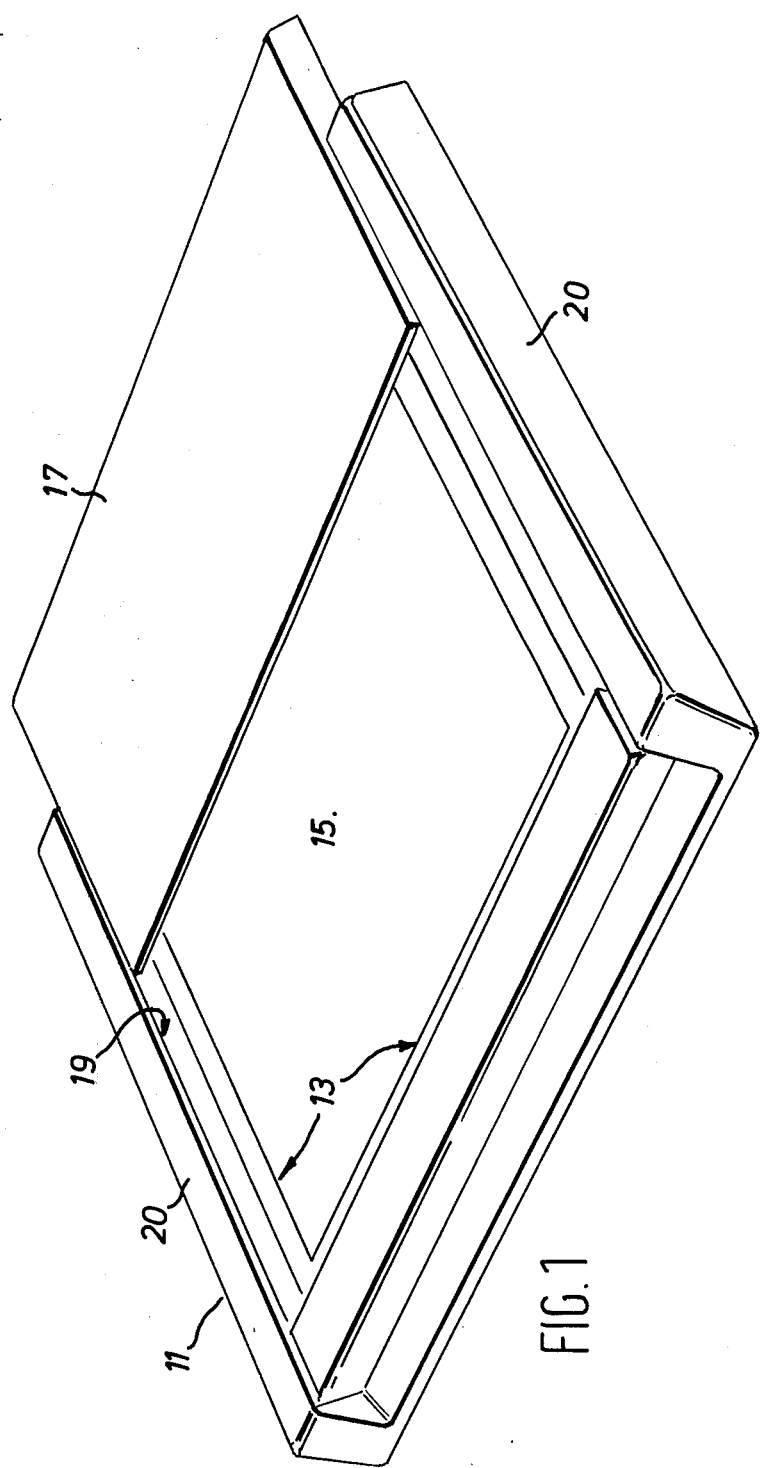
FIG. 1 is a general perspective view of a writing unit for a data input terminal in accordance with the invention.

The writing unit illustrated in FIG. 1 comprises a rectangular housing 11 provided in its upper wall with a window 13 exposing the upper surface of a taut flexible membrane 15 of a writing pad device housed within the unit. In use, a format sheet such as for example an order form, invoice or indeed any sheet of writing material for receiving hand-written symbols, writing or drawings is placed upon the flexible membrane 15. As will appear hereinafter, the membrane 15 is pressure sensitive so that the pen pressure acting on the membrane when writing on the format sheet with a relatively sharp writing instrument such as a ball-point pen enables the location of the pen to be substantially continuously sensed. Electrical signals are produced representing successively sensed locations, so that the successive signals represent the movements of the pen, and therefore the symbols or drawings produced thereby on the sheet of writing material. These signals can, for example, be used to reproduce the written symbols at a distance with suitable plotting equipment such as an oscilloscope, or can be further processed for character recognition and other analysis purposes.

Clearly, since the membrane 15 is pressure sensitive, it is undesirable for the surface of the membrane to be subject in use to any pressure other than that applied by the writing implement. In particular, pressure from the hand when writing on the sheet of writing material could interfere with satisfactory operation of the equipment. To provide a convenient hand-rest without touching the membrane, a hand-rest plate 17 is freely slideable in grooves 19 (only one shown in the drawing) formed in respective side members 20 of the housing 11 above but parallel with the plane of the membrane. The plate can, for example, be supported by means of roller bearings (not shown). In use, the hand can conveniently be rested on the plate 17 while writing, and the plate is free to follow the movement of the hand down the sheet without inconvenience to the writer.

Figure 2:
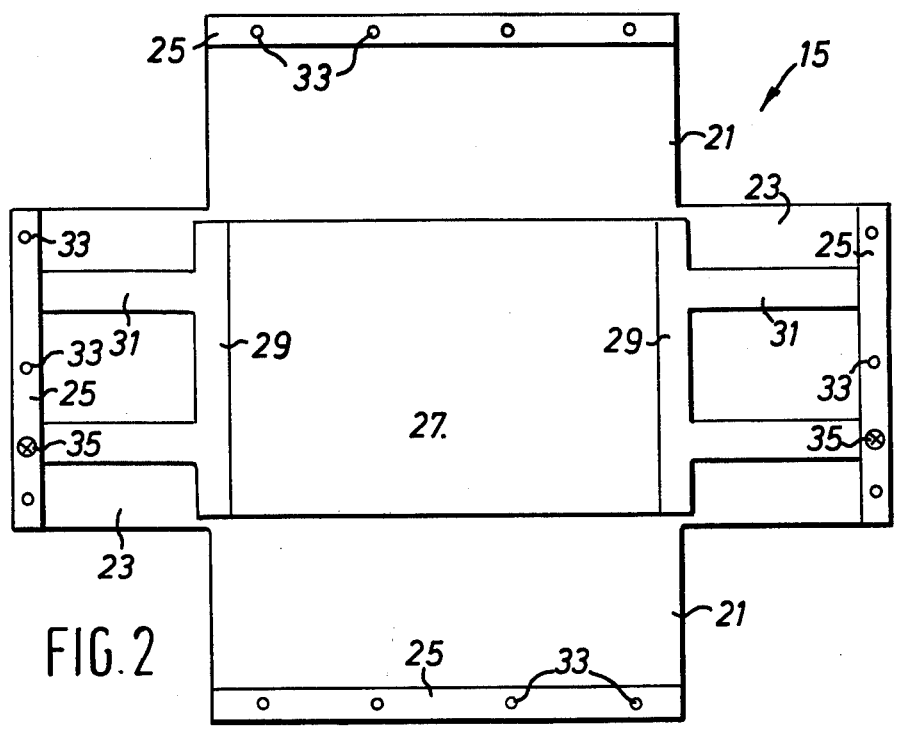
FIG. 2 is a view of the underside of the flexible membrane of the writing pad device comprised by the unit of FIG. 1.

FIG. 2 is an underside view of the membrane 15 when laid flat. The membrane 15 comprises a generally rectangular sheet of electrically insulating plastics material provided with side extensions 21 and end extensions 23. The extremities of the extensions 21, 23 are stiffened by stiffening bars 25 which may conveniently be of metal. The under surface of the membrane forms a first electrode surface and is provided with an electrically conductive coating comprising a relatively high surface resistivity portion 27 in the working area of the membrane (corresponding generally with the area of the upper surface exposed in window 13 — FIG. 1) and relatively low surface resistivity portions 29 and 31. Typically, the portion 27 can be a screen printed carbon film with a surface resistivity of several hundred ohms per square, and the portions 29 and 31 can be screen printed metallized film with a resistivity of substantially less than one ohm per square. In effect, therefore, the conductive film provides a film resistor 27 with end connections 29 and connection conductors 31. The conductors 31 make electrical cotact with respective ones of the metal bars 25 on extensions 23, the bars being provided with terminals 35 for external connection leads. Apertures 33 are provided in the bars 25 for receiving tensioning springs as described below.

Figure 3:
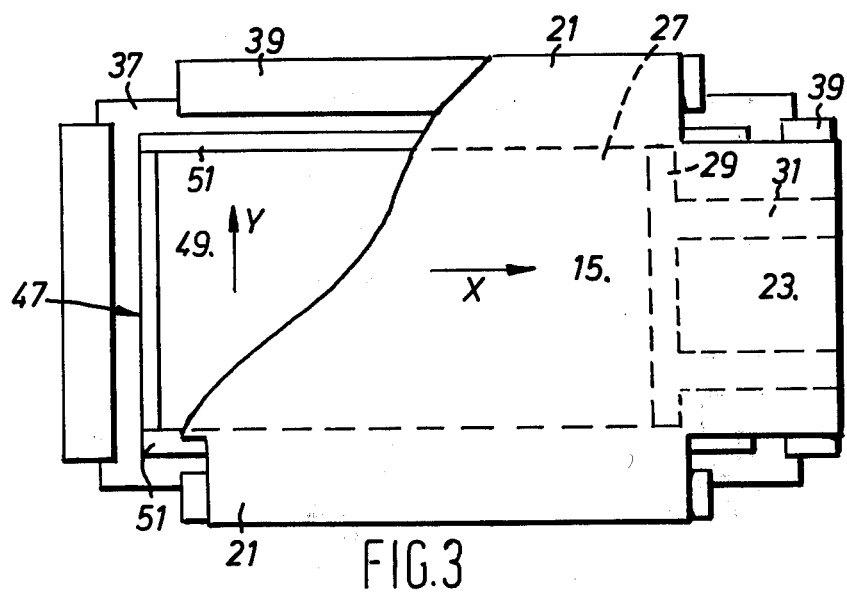
FIG. 3 is a schematic, part cut-away plan view of the writing pad device of the unit of FIG. 1.
Figure 4:
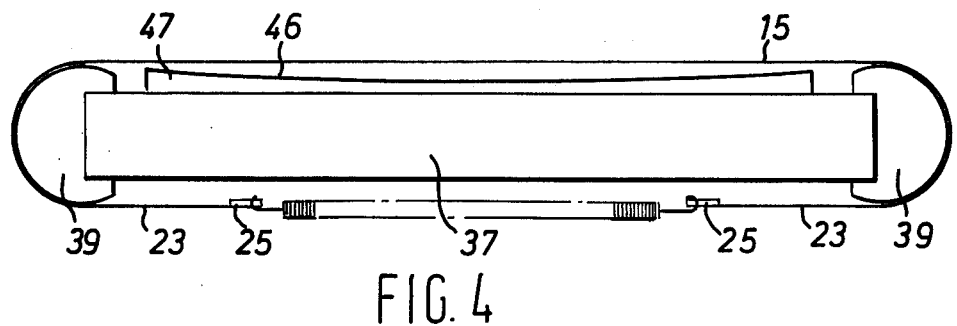
FIGS. 4 and 5 are respectively a schematic sectional side and an underside view of the pad device of FIG. 3.
Figure 5:
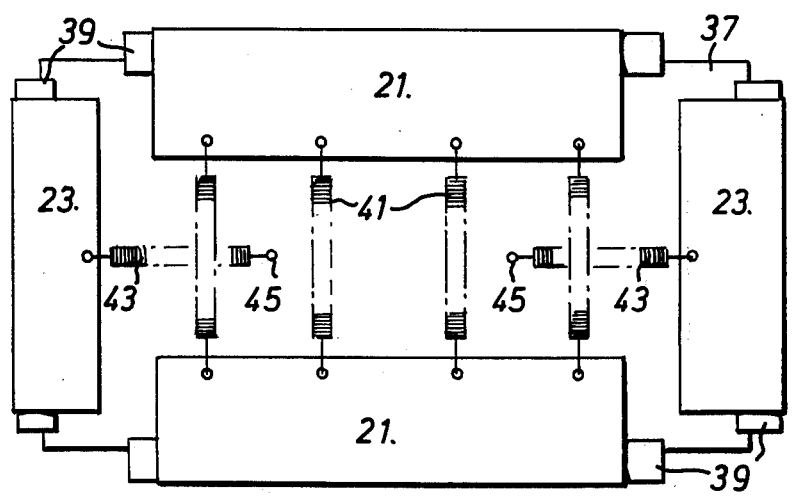

The construction of the writing pad device used in the unit of FIG. 1 is illustrated schematically in FIGS. 3, 4 and 5. The device comprises the membrane 15 supported in a plane adjacent to but spaced from the upper surface 46 of a backing member 47 of electrically insulating material, the conductive film on the membrane being on the underside so as to face the surface 46. The upper surface 46 of member 47 is also provided with an electrically conductive film forming a second electrode surface and comprising a high resistivity portion 49 in an area corresponding to the working area of the membrane and low surface resistivity portions 51 forming end connections for the portion 49. The portions 49 and 51 can be screen printed carbon and metallized films respectively having surface resistivities similar to the corresponding portions of the film on the membrane. Means are provided (not shown) for connecting external leads to the end connections 51.

As is best illustrated in FIG. 3, the membrane 15 and member 47 are mutually arranged so that voltages applied across the resistive films 27 and 49 between the respective pairs of end connections 29 and 51 are orthogonal, the direction of the voltage applied to the film 27 (and thus the potential gradient in the film) being in the direction of the X-axis indicated, and that applied to the film 49 being in the direction of the indicated Y-axis. In use, X and Y drive voltages are applied alternately, the open-circuit potential of one film being sensed during a period comprised by the period for which the drive voltage is applied to the other film. If an electrical contact is made between the two films at some location in the working area, therefore, the alternately sensed potentials of the films 27 and 49 represent respectively the Y- and X-coordinates of the location of the contact between the films.

Thus, if a format sheet placed upon the membrane 15 is written upon with a ball-point pen, the force applied by the pen tip presses the membrane into contact with the member 47 to make electrical connection between the two films, and the coordinates of the point of contact are represented by electrical signals derived from the alternately sensed potentials of the respective films 27 and 49.

To achieve satisfactory results from the apparatus, the force required to be applied at a point on the surface of the membrane 15 to cause the membrane to contact member 47 should be substantially the same for all points in the working area of the membrane. To this end, the upper surface 46 of the member 47 is concave. It has been found that optimum results can be achieved with a radius of concavity such that, for a working area of approximately 5 × 7.5 inches the separation between the membrane 15 and concave surface 46 should be approximately 0.060 inch at the center of the area reducing to approximately 0.030 inch at the edges of the area.

Further benefits as regards uniformity of the required membrane deflection force can be derived by mounting and tensioning the membrane in a suitable manner. In the illustrated embodiment, the membrane is substantially uniformly tensioned by stressed springs acting on the edges of the membrane, and is mounted in such a way as to be free to move against the action of the springs when a deflecting force is applied to the upper surface. As shown in FIGS. 4 and 5, the side and end extensions 21 and 23 are passed around part-cylindrical edge members 39 attached to the edges of base member 37, and the stiffening bars 25 at the extremities of the extensions are connected to tensioned helical springs 41 and 43. The springs 43 are anchored to posts projecting from the underside of member 37 while springs 41 interconnect opposite side extensions 21. Of course, many other convenient arrangements of springs would be equally satisfactory, provided a substantially uniform tension is applied to the membrane 15. The surfaces o the members 39 in contact with the membrane should be substantially frictionless, and may for example be coated with P.T.F.E. or have P.T.F.E. tape applied to them. Alternatively, the members 39 may be replaced by rollers to provide a substantially frictionless support for the membrane.

It will be appreciated that the illustrations in FIGS. 2 to 5 are purely schematic, and a practical embodiment would have many features which are not relevant to the present invention and have therefore been omitted from the drawings for the sake of clarity. In particular the member 37 would be provided with means for mounting the device in the housing 11 illustrated in FIG. 1.

Many modifications of the illustrated apparatus are possible without detracting from the advantages discussed above. For example, the tensioning springs or other tensioning means for the membrane could be arranged to act directly outwardly on the edges of the membrane, the whole of the membrane and the springs then lying in the plane of the working area of the membrane thereby dispensing with the necessity for a frictionless bearing such as presently provided by members 39. Such an arrangement would have the added advantage that the terminal unit itself could be reduced in height providing possible ergonomic advantages for the user.

In another possible modification, the hand-support plate 17 could be arranged to form part of an outer casing within which the writing pad device can slide towards and away from the plate 17. In yet another possible modification, the plate 17 and membrane 15 are maintained in fixed positions but the writing material is moved in relation to these, for example by moving the writing material on a line-by-line basis.

Referring again to FIG. 3, it will be appreciated that the accuracy with which the potential at a location on the electrode surface formed by either one of the films 27 and 49 represents the corresponding coordinate of that point will depend upon the linearity of the potential gradient across the film between the respective pair of end connections 29 or 51 under the influence of the drive voltage applied to that pair of connections. The linearity of the potential gradient is dependent on the uniformity of the surface resistivity of the film. In practice it has been found that the minimum surface resistivity variation which can be obtained over an area having dimensions of several inches is of the order of 1½%, and this clearly provides an upper limit to the accuracy with which the signals derived from the sensed potentials of the films 27 and 49 represent the coordinates of a contact between the films.

Figure 6:
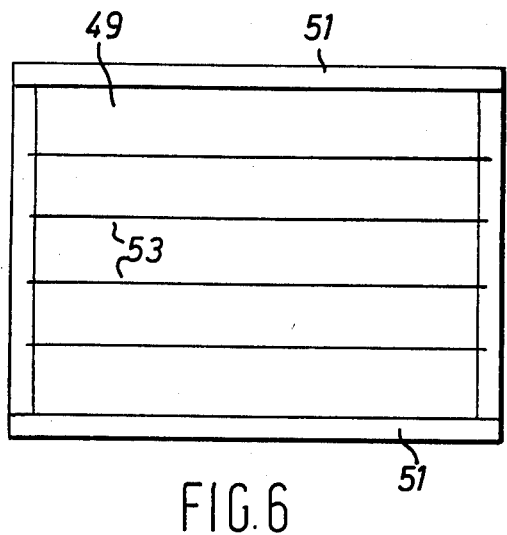
FIG. 6 is a plan view of a backing member with the electrically conductive film, a portion of the film being shown magnified in FIG. 6A.

The effect of variations of the surface resistivity on the linearity of the potential gradient can be substantially reduced by adopting the form of electrode surface illustrated in greater detail in FIG. 6. The upper surface of the electrically insulating member 47 is provided with a conducting film comprising a relatively high resistivity portion 49 forming a resistor and low resistivity portions 51 forming end connections for the resistor as described above. Additional low resistivity areas are provided in the form of relatively narrow strips of metallized film 53 which extend across the width of the resistor portion 49 parallel to the end connection portions 51.

The effect of the conductors 53 is to ensure that, at least in the regions of the film closely adjacent the conductors, the equipotential lines in the film are straight and parallel to the end connections 51. Moreover, deviation of the equipotentials from straight parallel lines in the intervening areas of the film 49 is substantially reduced.

Figure 6A:
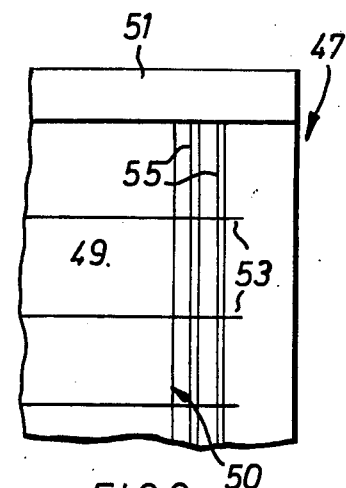

A further improvement in the uniformity of the potential gradient can be obtained by providing means for adjusting the total resistances between adjacent pairs of the conductors 53, thereby enabling any variations between the mean potential gradients between such pairs to be substantially reduced. Such a means for adjustment is illstrated in FIG. 6a which shows a portion of the area of the upper surface of the member 47 of FIG. 6. As shown, the conductors 53 are arranged to extend well beyond the edge 50 of the carbon film portion 49, and those conductors of each adjacent pair are interconnected by one or more resistance tracks 55 of relatively high resistivity film which conveniently can be of the same material as the film 49.

Fine adjustment or "training" of the total resistance between adjacent pairs of the conductors 53 can then be achieved by removing portions of the material of the resistance tracks 55, for example by scribing or abrasion.

Figure 7A:
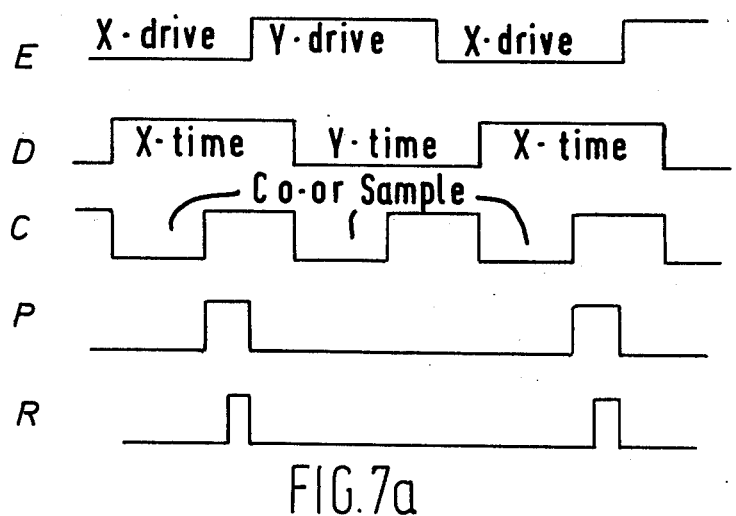
FIG. 7 is a block schematic diagram illustrating the operation of the coordinate sensing circuitry used in conjunction with the device of FIG. 2, the waveforms appearing at various points during operation of the circuitry being shown in FIG. 7A.
Figure 7:
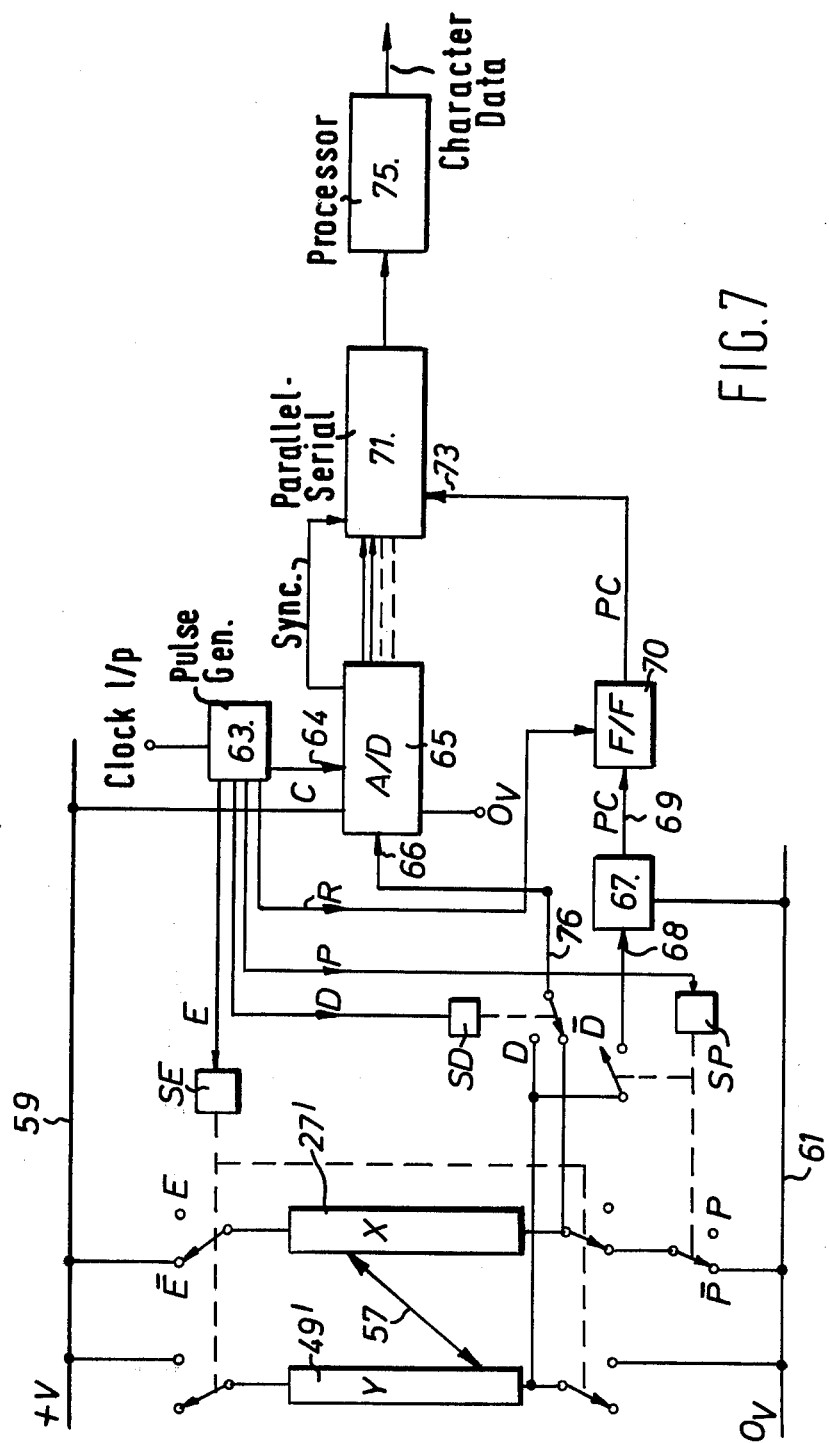

The electrical system for use in conjunction with the writing pad device described is illustrated in FIG. 7. It is to be appreciated that the illustration of FIG. 7 is a block schematic diagram which is intended to illustrate clearly the manner of operation of the electrical system, and is not intended to portray a practical circuit. For example, the functions indicated by means of relays in the drawing would in a practical circuit be implemented by the use of suitable transistor circuitry involving many more components than those indicated, and the logic functions indicated by separate blocks in the drawing might well in practice be implemented by common hardware components which cannot be individually identified with specific functions. However, it is believed that a person skilled in the art of electronic circuit design would have little difficulty in devising suitable practical circuits for implementing the functions described and illustrated.

In the drawing, the resistors formed by films 27 and 49 (FIG. 3) are indicated at 27' and 49' respectively. A contact between the films is represented by the arrow 57. The system as a whole is controlled by a pulse generator 63 responsive to a periodic clock input signal to provide five series of pulses E, D, P, R and C. The time relationships between the five series are illustrated in FIG. 7a. Pulse series E, D and P operate respective relays SE, SD and SP — the contacts of each relay being in the positions shown in the drawing when the level of the respective pulse signal is low, and in the opposite positions when the respective pulse signal level is high. Pulse series R is supplied to the strobe input of D/C flip-flop 70, the flip-flop 70 responding to a rising edge on the R signal level to register the bit presented at that instant on line 69. Pulse series C is supplied to sample control input 64 of dual-slop A/D converter 65 which responds selectively to the low C signal level to sample the voltage level at analogue signal input 66 for subsequent conversion to digital representation.

In operation, drive voltage supplied between positive rail 59 and ground rail 61 is applied alternately to resistors 27' and 49' by the action of relay SE, the resistors being allowed to float between applications of the drive voltage, and the potentials at the lower terminals of the resistors 27' and 49' are selected by sampling by the action of relay SD. It will be appreciated that when there is an interconnection between the resistors 27' and 49' such as indicated by arrow 57, in order that the sampled potential should accurately represent the position of the contact on the driven resistor the current drawn from the driven resistor should be insufficient to significantly affect the potential distribution across that resistor, or to provide a significant potential drop across that portion of the floating resistor through which it has to pass to reach the lower terminal. The input impedance of the device used to sense the potentials should therefore be high, and in practice a buffer amplifier would normally be provided in line 76.

The small phase lag in the operation of relay SD relative to that of relay SE is to allow time for the potentials established in resistors 27' and 49' to reach equilibrium before sampling is commenced. The overlap at the ends of the D-pulses, when the one of the resistors selected by SD is switched by SE to receive the drive voltage, is of no practical consequence since at this stage in the cycle sampling of the selected potential by A/D converter 65, as controlled by the C-pulses, has been completed.

During the latter part of the period for which the E-signal level is low, the X-drive period, and following completion of the corresponding sampling of the potential of the resistor 49' by A/D converter 65 to obtain the X-coordinate, relay SP is operated in response to a P-pulse. This isolates the lower end of resistor 27' from the ground rail 61 so that the whole resistor is clamped to the potential of the positive rail 59, and connects the lower terminal of resistor 49' with the input 68 of threshold circuit 67.

Threshold circuit 67 responds to analogue current applied at input 68 to provide a one-bit digital output on line 69 indicative of whether or not the analogue current exceeds a preselected threshold value.

The threshold circuit is thus responsive to the presence or absence of an interconnection 57 between the two resistors, the threshold level being set to discriminate between low input current levels such as would result from a poor contact between the films 27 and 49 (FIG. 3) and input current levels indicative of a satisfactory contact conductance. The resulting bit of information is stored in flip-flop 70 in response to an R-pulse as previously described, and the contents of flip-flop 70 is presented to a control input 73 of a parallel-serial converter 71.

Parallel-to-serial converter 71 responds to a signal on line 73 indicative of the presence of a satisfactory pad contact to accept sampled coordinate data in parallel-bit form from A/D converter 71 for supply to a processor 75 in serial-bit form. The data is provided by the converter 65 with a 10-bit resolution, and the data is reorganized by converter 71 into eight-bit words for compatability with the word format of processor 75.

Coordinate data is transmitted to processor 75 only when there is a change in that data. In more detail, the data is transmitted in blocks of 16 successive words in the following sequence:

Word 1 All zero's to indicate the start of a block;
Word 2 Seven most significant digits of X-coordinate + one indicator bit;
Word 3 Seven most significant digits of Y-coordinate + one indicator bit;
Word 4 Three least significant digits of X-coordinate + two indicator bits;
Word 5 Three least significant digits of Y-coordinate + two indicator bits;
Words 6 to 16 Two characters of four bits each representing incremental changes in the X- and Y-coordinates respectively, no transmission taking place until there is such a change.

At any time during transmission of a block at which the incremental change in either the X- or Y-coordinate data exceeds the scope of four bits, that block is terminated and a new block is started. When pad contact is broken, as indicated by a change in state of signal on input 73, two successive all-zero words are transmitted to indicate the fact to the processor. All transmission then ceases until such time that a new pad contact is made, when transmission is resumed starting with a new block.

Processor 75 analyses the coordinate data supplied by converter 71 to identify the characters written by hand on the sheet of writing material laid on the membrane 15 of the data input terminal and to register the locations of the characters on that sheet. Various validating checks may also be incorporated. For example, in the case of a format sheet being used the processor can be arranged to check that various hand-written characters are correctly located on the format, and the combinations of characters is an acceptable one in the case of that particular form.

Moreover, the processor can be arranged to service a plurality of input terminals simultaneously on a time division basis.

I claim:

1. A method of producing an electrode surface for electrographic apparatus, comprising the steps of forming on an insulating surface an electrically conducting coating comprising a series of elongated, separate strips of low surface resistivity interconnected by areas of high surface resistivity, providing connection means electrically connected with said coating so that the potential gradient developed in said coating in response to voltage supplied to said connection means is substantially orthogonal to the direction of elongation of said strips, and adjusting the total resistances between respective adjacent pairs of said low surface resistivity strips so as to substantially equalize the mean potential gradients which are developed across respective ones of said high surface resistivity areas in response to such voltage supplied to said connection means.

2. A method as claimed in claim 1 wherein said total resistances between respective adjacent pairs of said strips are adjusted by removing portions of said areas of high surface resistivity.

3. A method as claimed in claim 2 wherein said areas of high surface resistivity comprise broad areas extending between respective adjacent pairs of said low surface resistivity strips to form, in combination with said strips, an electrically continuous conductive region, and narrow areas, separated from said broad areas, extending between respective adjacent pairs of said low surface resistivity strips to form resistor tracks interconnecting said strips, and wherein the portions of said high surface resistivity areas which are removed are portions of said resistor tracks.

4. A method as claimed in claim 1 wherein the widths of said low surface resistivity strips are negligible compared with the separations of said strips.

5. A method as claimed in claim 4 wherein said low surface resistivity strips are deposited by screen printing metallized film onto said insulating surface with a surface resistivity of substantially less than one ohm per square, and said high surface resistivity areas are formed by screen printing carbon film with a surface resistivity of several hundred ohms per square.

6. Electrode surface means for electrographic apparatus, said electrode surface means comprising an insulating support member, an electrically conductive coating on a surface of said support member comprising a series of elongated separate strips of low surface resistivity material interconnected by areas of high surface resistivity material connection means electrically connected with said coating so that the potential gradient developed in said coating in response to voltage supplied to said connection means is orthogonal to the direction of elongation of said strips, and means for adjusting the total resistance between respective adjacent pairs of said strips.

7. Electrode surface means as claimed in claim 6 wherein said means for adjusting the total resistances between respective adjacent pairs of said low surface resistivity strips comprises resistor tracks formed by relatively high resistivity material deposited on said surface of said support member and electrically interconnecting respective adjacent pairs of said strips, portions of the said material of said resistor tracks being selectively removable from said surface to effect said adjustment.

8. Electrographic apparatus comprising a pressure sensitive surface and first and second normally electrically isolated electrode surfaces at least one of which is formed by the surface of the electrically conducting coating of electrode surface means in accordance with claim 6, the said surfaces being disposed generally parallel to one another and arranged so that pressure applied locally to said pressure sensitive surface electrically interconnects the said electrode surfaces.

9. Electrographic apparatus comprising an electrically insulating backing member formed with a first surface, a first electrically conductive coating on said first surface, a taut membrane of electrically insulating flexible material including a working area disposed in a plane adjacent said first surface and presenting thereto a second surface, a second electrically conductive coating on said second surface and electrically isolated from said first coating, at least one of said first and second coatings comprising a series of elongated, separate parallel strips of low surface resistivity material interconnected by areas of high surface resistivity material, connection means for connecting a voltage to said at least one of said first and second coatings in a direction substantially orthogonal to the direction of elongation of said strips, and means for adjusting the total resistances between respective adjacent pairs of said strips of said at least one of said coatings.

10. Apparatus as claimed in claim 9 wherein said means for adjusting the said total resistances comprises a plurality of resistor tracks electrically interconnecting respective pairs of said strips, portions of the material of said resistor tracks being selectively removable to effect said adjustment.

11. Apparatus as claimed in claim 9 comprising spring means connected with said membrane to substantially uniformly tension said membrane, said membrane being mounted so as to be free to move against the action of said spring means when deflected towards said first surface by an applied force.

12. Apparatus as claimed in claim 9 wherein said first surface is concave so that the force required to be applied to said membrane to cause said membrane to contact said first surface is substantially independent of the location within said working area at which the force is applied.

* * * * *